United States Patent

Soshi

[11] Patent Number: 5,146,261
[45] Date of Patent: Sep. 8, 1992

[54] AUTOMATIC FOCUSING CAMERA

[75] Inventor: Isao Soshi, Tokyo, Japan

[73] Assignee: Asahi Kogaku Kogyo Kabushiki Kaisha, Tokyo, Japan

[21] Appl. No.: 570,790

[22] Filed: Aug. 22, 1990

[30] Foreign Application Priority Data

Aug. 28, 1989 [JP] Japan .................. 1-220952

[51] Int. Cl.$^5$ .............................. G03B 13/36
[52] U.S. Cl. ...................... 354/402; 354/441
[58] Field of Search ............. 354/402, 403, 406, 407, 354/408, 400, 443, 441, 442

[56] References Cited

U.S. PATENT DOCUMENTS

| | | | |
|---|---|---|---|
| 4,750,013 | 6/1988 | Yasukawa | 354/400 |
| 4,878,080 | 10/1989 | Takehana et al. | 354/403 |
| 4,943,824 | 7/1990 | Nabeshima et al. | 354/400 |

FOREIGN PATENT DOCUMENTS 63-17416 1/1988 Japan .

OTHER PUBLICATIONS

English Abstract to Japanese Patent 63-17416.

Primary Examiner—W. B. Perkey
Attorney, Agent, or Firm—Sandler, Greenblum & Bernstein

[57] ABSTRACT

An automatic focusing camera including a control mechanism by which one of a plurality of automatic focusing modes is automatically selected in accordance with a photographing mode. The view finder of the camera is provided with a plurality of distance measuring zones, and distances of objects corresponding thereto are measured, respectively, to enable an output of distance measuring data. The automatic focusing modes are set for a plurality of the distance measuring zones, to thereby focus the photographing lens on one or more objects corresponding to the distance measuring zones. The control unit, based on lens information of the photographing lens and the distance measuring data, calculates a depth of field in accordance with the selected automatic focusing mode, and determines whether or not the object distance is within the required depth of field, to thereby cause the photographing lens to be moved into the required depth of field.

13 Claims, 7 Drawing Sheets

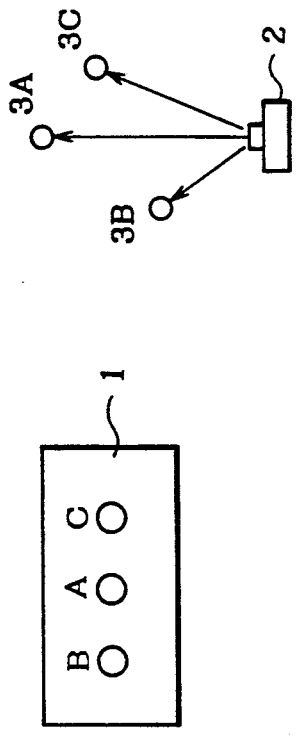
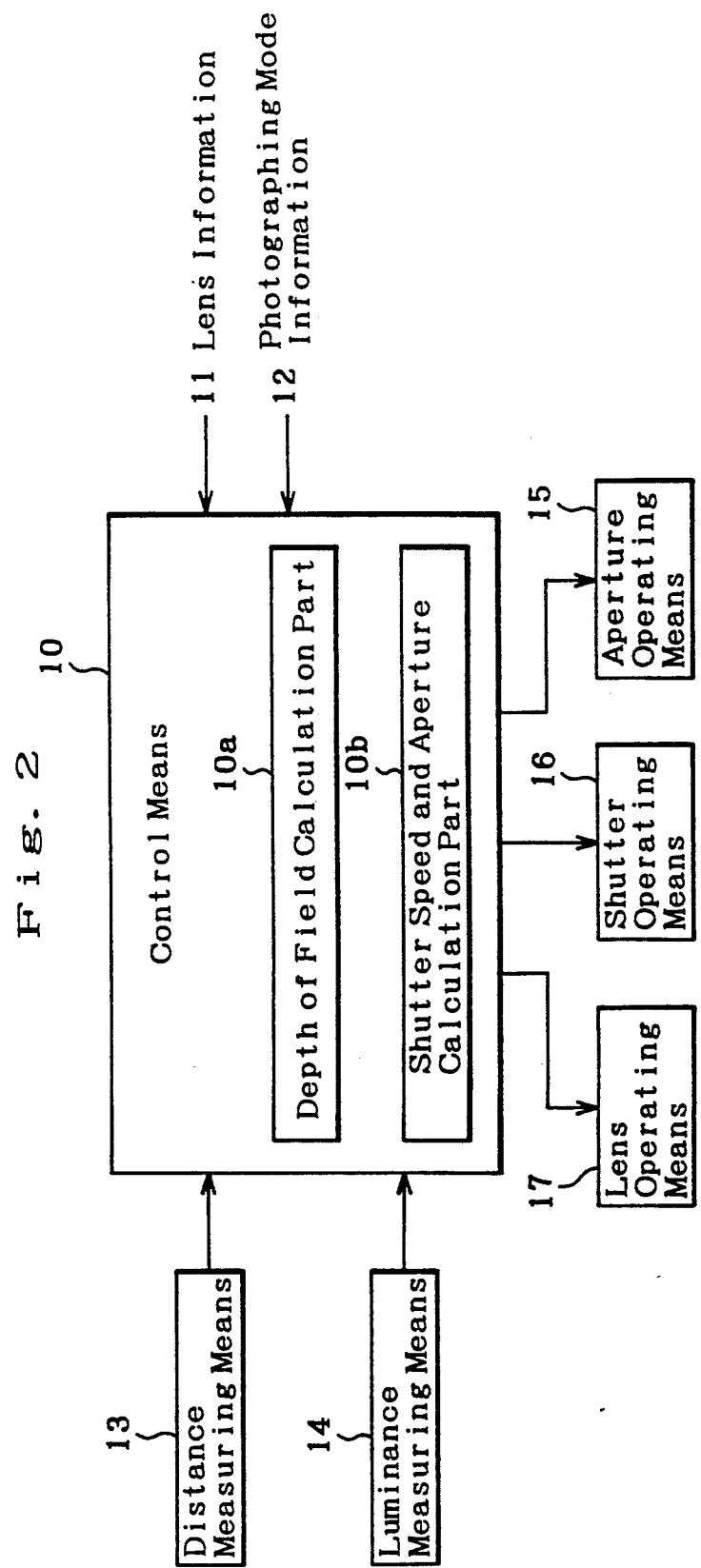

AUTOMATIC FOCUSING CAMERA

BACKGROUND OF THE INVENTION

1. Field of the Invention

The present invention relates to an automatic focusing camera is provided with a view finder having a plurality of distance measuring zones.

2. Description of the Related Art

A conventional automatic focusing camera is provided with a view finder having portions corresponding to a plurality of distance measuring zones. The camera is also provided with an automatic focusing mode selecting system in which, when an automatic focusing is carried out in accordance with distance measuring data obtained from the distance measuring zones, one of distance measuring zones is selected for carrying out an in-focus operation. In the alternative a combination of a plurality of distance measuring zones is used to carry out the in-focus operation.

In the case of an automatic focusing camera having, for example, three distance measuring zones, the automatic focusing mode selecting system is constructed in such a manner that the distance measuring zone determined to be the nearest is selected from among the three distance measuring zones. When two distance measuring zones have equal subject distances, among the three distance measuring zones, those two distance measuring zones are selected to carry out an in-focus operation.

In the conventional automatic focusing camera, however, when a plurality of objects located at different distances are to be photographed, for example, under various photographing conditions, although a sharply-focused image of an object located within one distance measuring zone is obtained, an object located out of this distance measuring zone may not be in sharp focus.

Therefore, when photographing a plurality of objects located at different distances from the camera, the photographer may attempt to adjust the aperture based on personal perception so that the depth of field is expanded. In another case, although the photographer may select an automatic focusing mode from among the automatic focusing modes which fit the purpose of the photographing, when photographing can not be carried out with the selected automatic focusing mode, the photographer must change the selected mode and select another automatic focusing mode. Therefore, as described above, conventionally it is troublesome to photograph a plurality of objects, i.e., the focusing operation is complicated and inconvenient.

SUMMARY OF THE INVENTION

Therefore, the object of the present invention is to provide an automatic focusing camera in which an automatic focusing mode is automatically selected by taking into consideration information such as a depth of field and a lens focal length, to thereby obtain an improved ease of operation.

According to the present invention, there is provided an automatic focusing camera for carrying out a photographing operation according to a photographing mode, and having a view finder provided with a plurality of distance measuring zones. The camera comprises a photographing lens, a measuring mechanism, and a control mechanism for controlling the focusing of the photographing lens.

The measuring mechanism measures the distances of objects corresponding to the distance measuring zones, respectively, and outputs distance measuring data indicating the subject distances. The control mechanism selects, in accordance with the photographing mode and the distance measuring data, one of the automatic focusing modes set for a plurality of the distance measuring zones, and, based on lens information of the photographing lens and the distance measuring data, calculates a depth of field in accordance with the selected automatic focusing mode, determines whether or not the subject is within the required depth of field, and operates the photographing lens to move the lens into the required depth of field.

Further, according to the present invention, there is provided an automatic focusing camera having a view finder provided with a plurality of distance measuring zones, and comprising a photographing or taking lens, a measuring mechanism, and a control mechanism for controlling the focusing of the taking lens.

The measuring mechanism measures the distances of objects corresponding to the distance measuring zones, respectively, and outputs distance measuring data denoting indicating the object distances. The control mechanism selects, in accordance with a focal length of the taking lens and the distance measuring data, one of automatic focusing modes set for a plurality of the distance measuring zones, and based on lens information from the taking lens and the distance measuring data, calculates a depth of field in accordance with the selected automatic focusing mode, determines whether or not the subject is within the required depth of field, and operates the taking lens to move the lens into the required depth of field.

Still further, according to the present invention, there is provided an automatic focusing camera comprising a distance measuring mechanism, a luminance or brightness measuring mechanism, and a control mechanism for controlling a focusing of the photographing or taking lens.

The distance measuring mechanism measures the distances of objects corresponding to a plurality of distance measuring zones, and the luminance measuring mechanism measures the luminance of the objects. The control mechanism calculates a shutter speed and an aperture value based on a photographing mode and photometry data obtained by the luminance measuring mechanism, and selects, in accordance with the photographing mode and distance measuring data, one of the automatic focusing modes set for a plurality of the distance measuring zones, and based on the lens information and the distance measuring data, calculates a depth of field in accordance with the selected automatic focusing mode, determines whether or not the object is within the required depth of field, and operates the taking lens to move the lens until it is in focus.

In this invention, when a preset automatic focusing mode is selected based on the distance measuring data and the photographing mode information, a depth of field is calculated in accordance with the automatic focusing mode, and it is determined whether or not the object is within the required depth of field. If the object is within the required depth of field, the automatic focusing mode is determined and the taking lens is operated to be moved into focus, and conversely, if the object is out of the required depth of field, the automatic focusing mode is changed to another automatic focusing mode. Accordingly, in the present invention, a true photograph of an object, as required by the photographer, is easily obtained without a manual operation.

BRIEF DESCRIPTION OF THE DRAWINGS

The present invention will be better understood from the description of the preferred embodiments thereof set forth below, together with the accompanying drawing, in which:

FIG. 1a is a schematic view of a view finder provided with three distance measuring zones;

FIG. 1b is a schematic view showing an example of a positional relationship among objects;

FIG. 2 is schematic view showing a construction of a main part of an automatic focusing camera to which the present invention is applied;

DESCRIPTION OF THE PREFERRED EMBODIMENTS

Figure 3:
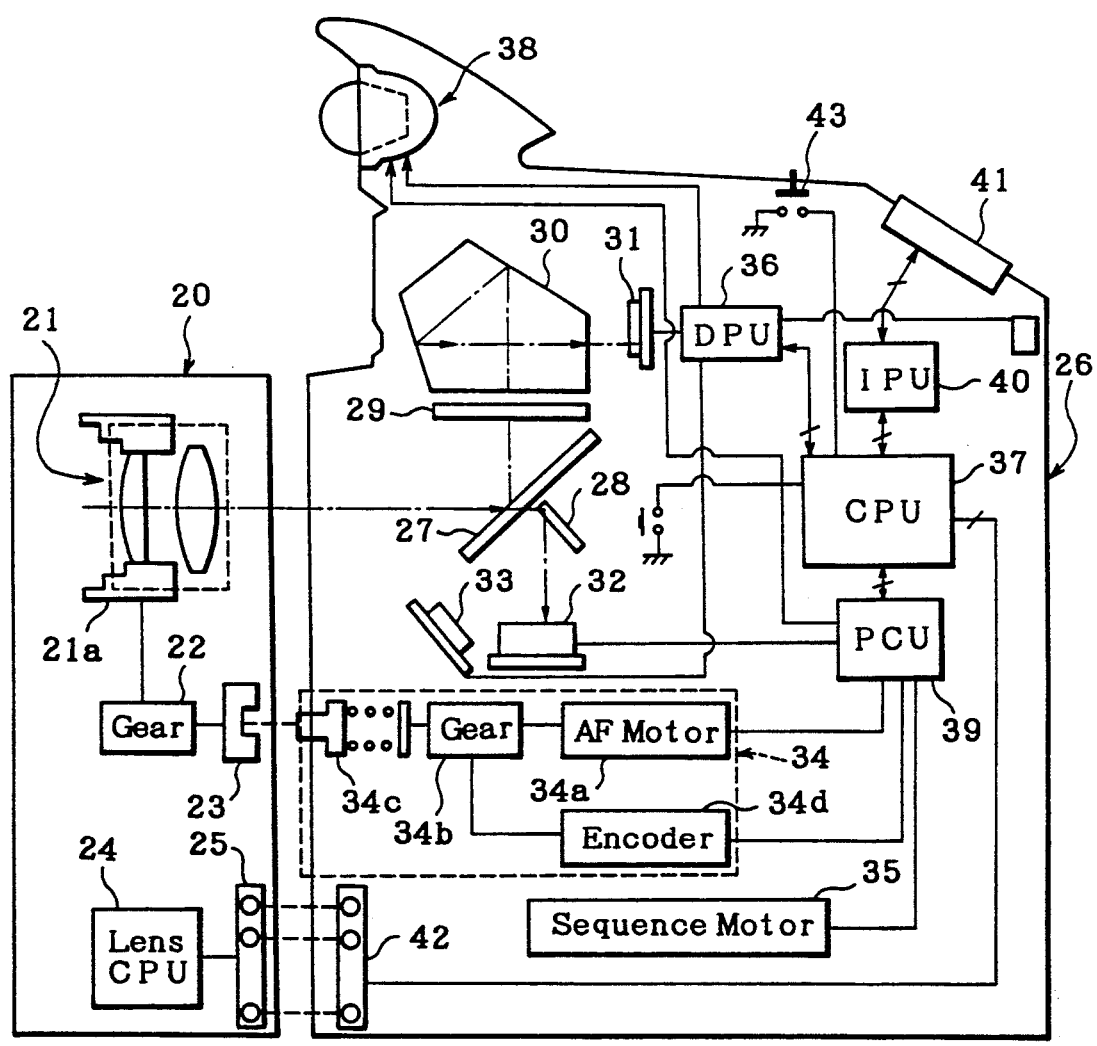
FIG. 3 is a block diagram showing the entire construction of an automatic focusing single reflex camera to which the control means shown in FIG. 2 is applied.

The present invention will now be described with reference to embodiments shown in the drawings, beginning with a description of the principle of the present invention.

Referring to FIG. 1a, a view finder 1 is provided with three different distance measuring zones, A, B and C, to which objects 3A, 3B and 3C located at different distances from a camera body 2 correspond, respectively, as shown in FIG. 1b.

As a method of automatic focusing (hereinafter referred to as AF mode), applied to three such distance measuring zones, the AF modes described below can be used.

⓪ The taking lens is focused in zone A.

① The taking lens is moved to an in-focus position at which the three zones A, B and C are within one depth of field.

② The two distance measuring zones (B and C in FIG. 1a) in which the objects 3B and 3C are the closest to the photographer (i.e. to the camera body 2) are selected, and the taking lens is moved to a position at which the two objects 3B and 3C are within one depth of field.

③ The two distance measuring zones (A and C in FIG. 1a) in which the distance between the two objects 3A and 3C is the smallest among the zones A, B and C, are selected, and the taking lens is moved to a position at which the object distances of the two objects 3A and 3C are within one depth of field.

④ The distance measuring zone (C in FIG. 1a) in which the object distance is at an intermediate distance among the zones A, B and C is selected, and the taking lens is moved to a position at which that object is within the depth of field.

⑤ The distance measuring zone (B in FIG. 1a) in which the object distance is closest to the photographer among zones A, B and C is selected, and the taking lens is moved to a position at which that object is within the depth of field.

⑥ The distance measuring zone (A in FIG. 1a) in which the object distance is the farthest from the photographer among A, B and C is selected, and the taking lens is moved to a position at which that object is within the depth of field.

As a method by which these AF modes are preset and the proper AF mode is selected from among the AF modes ⓪ ~ ⑥, the following methods (a) and (b) can be applied to a camera.

(a) The AF mode is selected in accordance with a photographing mode or a focal length of a taking lens fitted to the camera.

(b) Each AF mode is given a different priority order, respectively, for each photographing mode, and when an AF mode having a highest priority can not be selected, the AF mode having the next priority is selected.

This type of selection of the AF mode, enables the photographer to obtain a true photograph of the target object.

FIG. 2 shows a construction of the main parts of an automatic focusing camera in which the present invention as described above is embodied.

As shown in FIG. 2, a control means 10 is provided for controlling the automatic focusing camera as a whole, and is provided with a depth of field calculation part 10a and a shutter speed and aperture value calculation part 10b.

Lens information 11 such as a focal length, an f-number of the maximum aperture and the like, and a photographing mode information 12 for an exposure control are inputted to the control means 10.

Distance measuring means 13 are provided for measuring object distances corresponding to a plurality of distance measuring zones provided in a view finder, respectively, and outputting the distance measuring data to the control means. Photometry means 14 are provided for measuring an object luminance in the view finder, and outputting the photometry data to the control means. The distance measuring means 13 and the luminance measuring means 14 are connected to the control means 10. Further, aperture operating means 15, shutter operating means 16, and lens operating means 17 are connected to the control means 10, and controlled by signals outputted from the control means 10.

In the automatic focusing camera constructed as described above, the shutter speed and aperture value calculation part 10b of the control means 10 calculates a shutter speed and an aperture value based upon the photographing mode information 12 and photometry information outputted from the luminance measuring means 14, and outputs the calculation result to the aperture operating means 15 and the shutter operating means 16, to thereby control these means.

In accordance with the photographing mode 12, the control means 10 selects the preset AF modes ⓪ ~ ⑥ and outputs a command for an in-focus operation to the lens operating means 17. Then, if a depth of field must be calculated in accordance with the selected AF mode, the control means 10 selects the necessary distance measuring information from a plurality of information outputted by the distance measuring means 13, and calculates an aperture value and an in-focus object distance at the depth of field calculation part 10a, using the selected distance measuring information and the lens information 11. Based upon the calculation result, the control means 10 determines the most suitable lens position, and outputs a command to the lens operating means 17 for controlling the photographing lens. Depending upon the calculation result, the control means 10 may try again to select another AF mode.

In accordance with the depth of field calculated as described above, and the photographing mode information, the preset AF modes ⓪~⑥ are automatically selected, and accordingly, the taking lens is driven to a suitable position, whereby a photograph which conforms to the intent of the photographer is obtained.

The determination of whether or not an object is within a depth of field (hereinafter referred to as a determination of a depth of field) is based upon the following calculations.

Assuming that an object is located at a distance "v" from the camera, a distance of a point within the depth of field and near the camera is $D_1$, and a distance of a point within the depth of field and far from the camera is $D_z$, then $$D_1 = f^2 v/[f^2 + (v-f)\delta' F] \quad (1)$$

$$D_2 = f^2 v/[f^2 - (v-f)\delta' F] \quad (2)$$

wherein
 f: focal length of lens
 $\delta'$: permissible circle of confusion (the largest acceptable circle of confusion)
 F: aperture value The focal length of lens "f" and the permissible circle of confusion "$\delta'$" are obtained from a lens CPU 24 described later, and the aperture value "F" corresponds to an aperture value Av obtained by a photometry calculation.

Therefore, for example, the nearest distance $D_n$ among the distance measuring data is set as $D_1$ so that the distance "v" is obtained by the equation (1), and then the obtained "v" is inserted to the equation (2) to obtain $D_2$. Comparing the obtained $D_2$ with the farthest distance $D_f$ in the distance measuring data, if $D_2 \geq D_f$, it is determined that $D_n$ and $D_f$ are within the depth of field, and conversely, if $D_z < D_f$, it is determined that $D_n$ and $D_f$ are out of the depth of field.

Namely, if $D_z \geq D_f$, by adjusting the taking lens to be focused on the object located at the distance "v", the object is in-focus and $D_i$ and $D_z$ are within the depth in field.

FIG. 3 shows in schematic form, the entire construction of an automatic focusing single reflex camera to which the control means utilized are substantially shown in FIG. 2.

A lens part 20 comprises a taking lens 21, a distance ring 21a, a gear 22 for rotating the distance ring 21a, and a coupler 23 mechanically engaging with and disengaging from a lens drive mechanism utilized for in-focus operation and provided in a camera body 26. This lens drive mechanism is described later. The lens part 20 further comprises a lens CPU 24 which stores lens information such as a focal length, an aperture f-number, and a permissible circle of confusion (the largest acceptable circle of confusion) of the taking lens 21, and transfers the lens information to the camera body 26, and a mount contact 25 which provides an electrical contact between the lens CPU 24 and the camera body 26.

The camera body 26 includes a main mirror 27 and a sub mirror 28 disposed on an optical axis of the taking lens 21, and a focusing screen 29 and a pentagonal prism 30 positioned above the main mirror 27. The camera body 26 further includes a photometry photo sensor 31 disposed behind the pentagonal prism 30, for sensing the brightness of luminance of an object, an AF sensor 32 and a photo sensor 33 as an automatic regulator used for an automatic flash, which are disposed at the side to which a beam reflected from the sub mirror 28 is directed, a lens drive mechanism 34, and a sequence motor 35 for winding of a film, moving the mirror up, and releasing the shutter.

The lens drive mechanism 34 is composed of an AF motor 34a, a gear 34b, and a coupler 34c which transmits rotation of the AF motor 34a to the coupler 23 of the lens part 20, and an encoder 34d for sensing the amount of rotation of the gear 34b.

A processing unit for photometry (hereinafter referred to as DPU) 36 is provided for calculating photometry data based upon signals outputted from the photometry photo sensor 31. The calculation result is outputted to a central processing unit (hereinafter referred to as CPU) 37, so that the DPU 36 outputs a command in accordance with an instruction from the CPU 37 to actuate an electronic flash (not shown) and a light emitting part of an AF spot beam generating part 38.

A process control unit (hereinafter referred to as PCU) 39 is provided for controlling the AF motor 34a of the lens drive mechanism 34, the sequence motor 35, and the light emitting part of the AF spot beam generating part 38. The PCU 39 receives signals outputted from the AF sensor 32 and the encoder 34d, and transmits data between the CPU 37 and the PCU 39.

An indication processing unit (hereinafter referred to as IPU) 40 transmits electric power and data such as an ISO sensitivity and a photographing mode to the CPU 37, according to an operation of not shown switches, and outputs an indication command outputted from the CPU 37 to an external indication part 41 comprising a liquid crystal display, so that a photographing mode, an AF mode, a shutter speed, and an f-number are indicated on the external indication part 41. The CPU 37 and the lens CPU 24 are connected to each other through the mount contact 25 of the lens part 20 and the mount contact 42 of the camera body 26. An electric source switch 43 is connected to the CPU 37.

The CPU 37, the DPU 36, the PCU 39, and the IPU 40 correspond to the control means 10 shown in FIG. 2.

The CPU 37 includes a ROM (not shown) for storing programs determining a shutter speed $T_V$ and an aperture value $A_V$ in accordance with a photographing mode and photometry data, and a RAM (not shown) storing the shutter speed $T_V$, the aperture value $A_V$, and photometry data. Calculation for obtaining a depth of field and for obtaining a shutter speed and an aperture value are carried out by the CPU 37.

Figure 4:
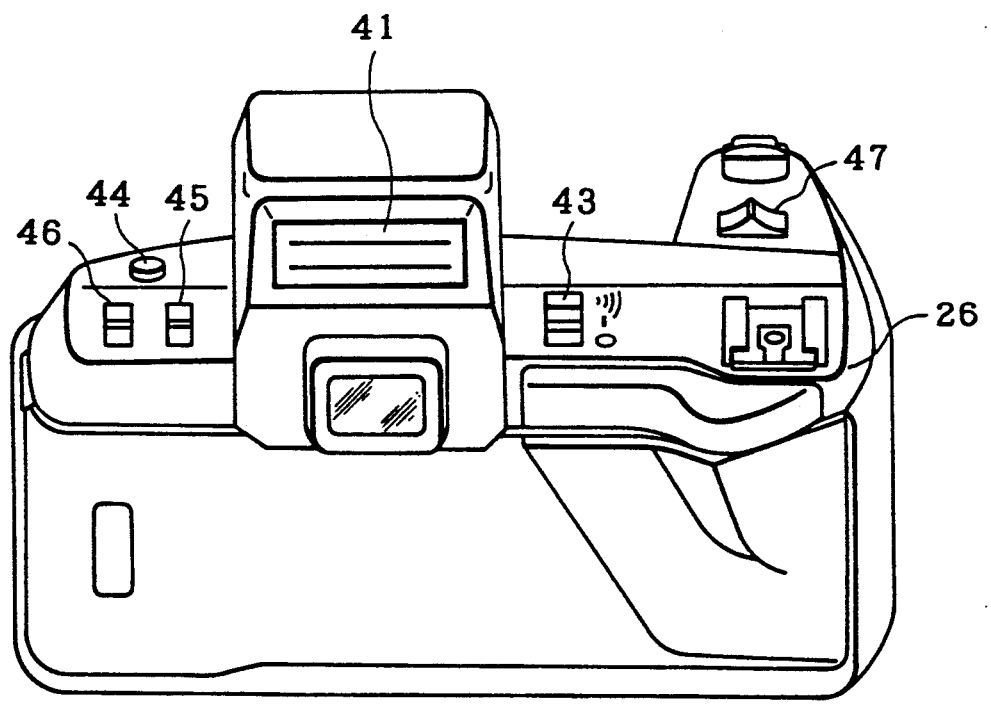
FIG. 4 is a perspective view showing the external appearance of an automatic focusing single reflex camera having each component shown in FIG. 3.

FIG. 4 shows an external appearance of an automatic focusing single reflex camera having each component shown in FIG. 3. As shown by this drawing, an electric source switch 43, an AF mode selection button 44, a photographing mode and drive mode switching lever 45, an exposure factor and ISO sensitivity switching lever 46, and an up and down lever 47 are provided on an upper surface of the camera body 26.

Operation of an embodiment of the invention is described below.

To simplify the explanation, it is assumed that the automatic single reflex camera of this embodiment carries out the photographing operation using three kinds of programmed AE (automatic exposure) modes, i.e., a depth of field priority program AE (hereinafter referred to as $P_{AV}$ mode), a normal program AE (hereinafter referred to as $P_N$ mode), and a shutter speed priority AE (hereinafter referred to as $P_{TV}$ mode).

First, the electric source switch 43 is turned ON, so that electric power is supplied to each portion and lens information stored in the lens CPU 24 is loaded to the RAM of the CPU 37, whereby the camera is in an operative state and able to carry out a photographing operation.

Then, the photographer switches the photographing mode and drive mode switching lever 45 to the photographing mode, operates the up and down lever 47 to select a photographing mode which corresponds to the photographing purpose, and pushes the release button halfway to start a photometry and a distance measuring process. Since the photometry process is well known in the art, an explanation thereof is omitted from this specification.

When performing distance measuring, for carrying out a determination of depth of field, the CPU 37 calculates, in accordance with the defocus amount, the distance between the camera and the object, based on the outputted signal from the AF sensor 32, and the CPU 37 then determines, in accordance with the obtained distance, whether or not the object is within the depth of field.

The defocus amount x', which is the amount of discrepancy for an in-focus state, is obtained from information from the AF sensor 32 and the lens information, and a distance data x is obtained from the defocus amount x'. The equation used in this calculation is as follows:

$$x \cdot x' = f^2$$

$$\therefore x = f^2/x' \quad (3)$$

where $X' = c + d$ wherein "c" is the amount of lens movement which is the distance between the present lens position and an in-focus position, when the object is located at infinity, and "d" is the defocus amount inputted from the AF sensor 32. The amount of lens movement "c" may be obtained by a well known encoder, which includes a code plate (not shown in FIG. 3), which may be mounted on the distance ring 21a, and a brush slidably contacting the code plate, as is commonly used in cameras.

The determination of the depth of field is carried out in accordance with the equations (1) and (2), based on the distance data x, an aperture value determined in accordance with photometry data, and the lens information, and according to the calculation result, the lens drive mechanism 34 is operated and the AF mode is changed, so that a predetermined in-focus operation is carried out.

A more concrete operation of the embodiment is described below with reference to the flow charts shown in FIG. 5 through 10.

The AF mode selection button 44 shown in FIG. 4 is pushed down, so that, as shown in the table below, the AF modes ①~⑥ can be arbitrarily selected or an automatic AF mode in which the AF modes are automatically selected can be set. In the table, a vertical line between numerals means that the AF modes shown on the left side of the vertical line can be selected in the automatic AF mode, as described later.

TABLE

| photographing mode | (AF mode) high ← priority order → low |
|---|---|
| $P_{AV}$ mode | ① ② ③ ⑤ \|④ ⑥ |
| $P_N$ mode | ② ③ ⑤ \|④ ① ⑥ |
| $P_{TV}$ mode | ⑤ \|② ③ ④ ① ⑥ |

In the former mode, i.e., in the arbitrary selection mode, each AF mode is successively selected by manually pushing down the AF mode selection button 44 and the photographing is carried out in accordance with the selected AF mode. For example, if a $P_{AV}$ mode is selected by the photographing mode and drive mode switching lever 45, by pushing the the AF mode selection button 44, the AF mode is successively changed as ①→②→③→⑤→④→⑥, as shown in the above table.

Conversely, in the embodiment of the present invention, the automatic AF mode is carried out in such a manner that the AF mode is automatically selected. Namely, if the $P_{AV}$ mode is selected, the AF mode is automatically selected in the order ①→②→③→⑤, depending upon a photographing condition; if the $P_N$ mode is selected, the AF mode is automatically selected in the order ②→③→⑤, depending upon a photographing condition; and if the $P_{TV}$ mode is selected, the AF mode is automatically selected as ⑤. Namely, in this embodiment, the AF modes shown at the left side of the vertical line in the above table can be selected. Note that the selected AF mode, and a warning that an AF mode cannot be selected, are indicated at the external indication part 41.

Figure 5:
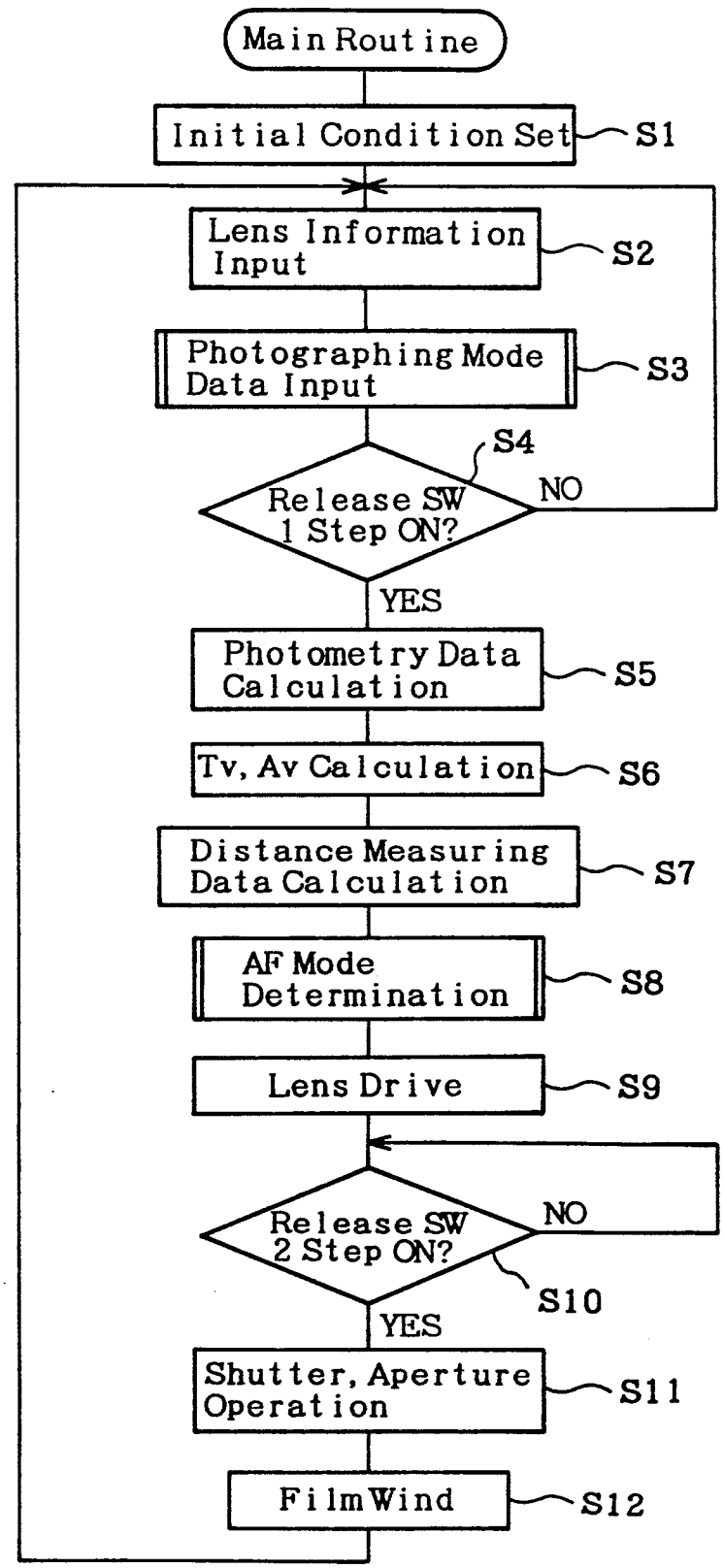
FIG. 5 is a flow chart showing a main routine.

FIG. 5 is a flow chart showing a main routine. This main routine is started when the electric source switch 43 is turned ON. In step S1, an initial condition is set in which, for example, the AF mode ⓪ and the photographing mode $P_N$ are set, and in step S2, the lens information 11 (such as a focal length, an f-number of an open aperture, and a permissible circle of confusion) sent to the camera body 26 is read from the lens CPU 24 and stored in the CPU 37 provided in the camera body 26, whereby a photographing operation can be carried out.

Figure 6:
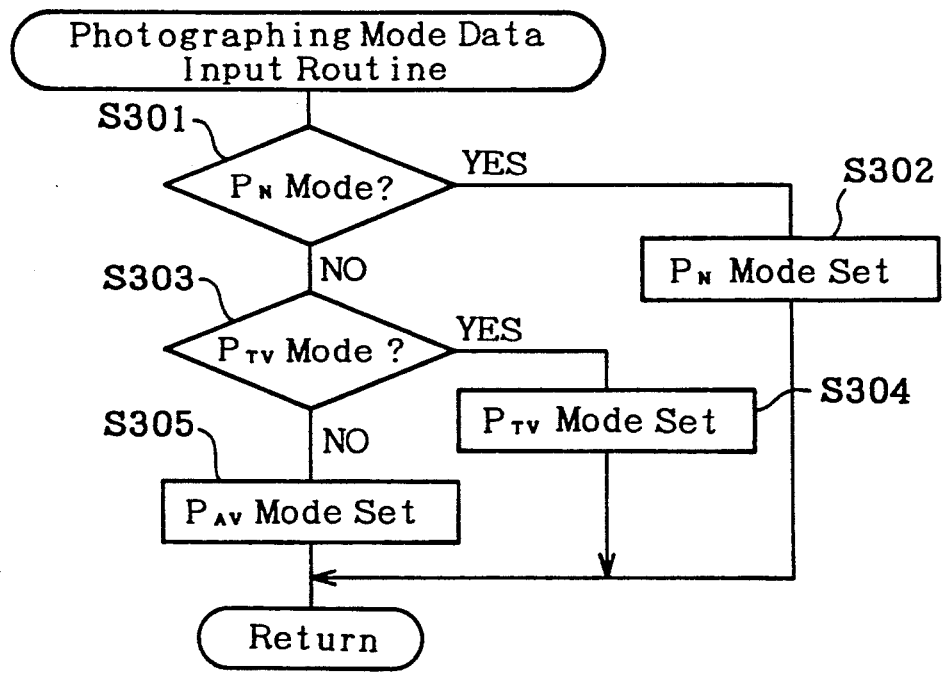
FIG. 6 is a flow chart showing a photographing mode data input routine.

In step S3, the photographing mode and drive mode switching lever 45 is switched to the photographing mode, and the up and down lever 47 is operated to carry out a photographing mode input routine shown in FIG. 6.

In step S4, it is determined whether or not the release switch has been pushed halfway down, i.e., operated by one step, and if the release switch has not been operated, the process returns to step S2. If the release switch has been operated by one step, step S5 is carried out so that output signals from the photometry photo sensor 31 are inputted to the CPU 37 through the DPU 36, to thereby calculate the photometry data.

Then, in step S6, a shutter speed $T_V$ and an aperture value $A_V$ are obtained in accordance with the photographing mode data and the photometry data.

In step S7, signals output from the AF sensor 32 are inputted to the CPU 37 through the PCU 39, and the distance measuring data is calculated. This data is used together with the photographing mode data to determine the AF mode in step S8.

Then the process goes to step S9, in which the lens driving mechanism 34 is operated in accordance with the determined AF mode, so that the taking lens 21 is driven, through the distance ring 21a, to be moved to a predetermined position.

Step S10 is carried out until it is determined that the release switch has been turned ON by two steps by pushing the release button all the way down, and then the process goes to step S11, in which the sequence motor 35 is driven to thereby operate the shutter and the aperture and carry out an exposure. After the exposure is carried out, the process goes to step S12, in which a film is wound up, and the process then returns to step S2.

FIG. 6 is a flow chart showing a photographing mode data input routine carried out in step S3 of the main routine.

By selecting the photographing mode by the photographing mode and drive mode switching lever 45, and successively pushing the up and down lever 47, one of the $P_N$ mode, $P_{TV}$ mode, and $P_{AV}$ mode is selected and set.

Namely, first, in step S301, it is determined whether or not the $P_N$ mode has been selected. If it is determined that the $P_N$ mode has been selected, the process goes to step S302 in which the $P_N$ mode is set, and the data showing the $P_N$ mode is inputted to the CPU 37.

Conversely, if it is determined that the $P_N$ mode has not been selected, the process goes to step S303 in which it is determined whether or not the $P_{TV}$ mode has been selected. If it is determined that the $P_{TV}$ mode has been selected, the process goes to step S304 in which the $P_{TV}$ mode is set, and the data showing the $P_{TV}$ mode is inputted to the CPU 37.

In step S303, if it is determined that the $P_{TV}$ mode has not been selected, the process goes to step 305 in which the $P_{AV}$ mode is set, and the data showing the $P_{AV}$ mode is inputted to the CPU 37. Then the process returns to the main routine.

Figure 7:
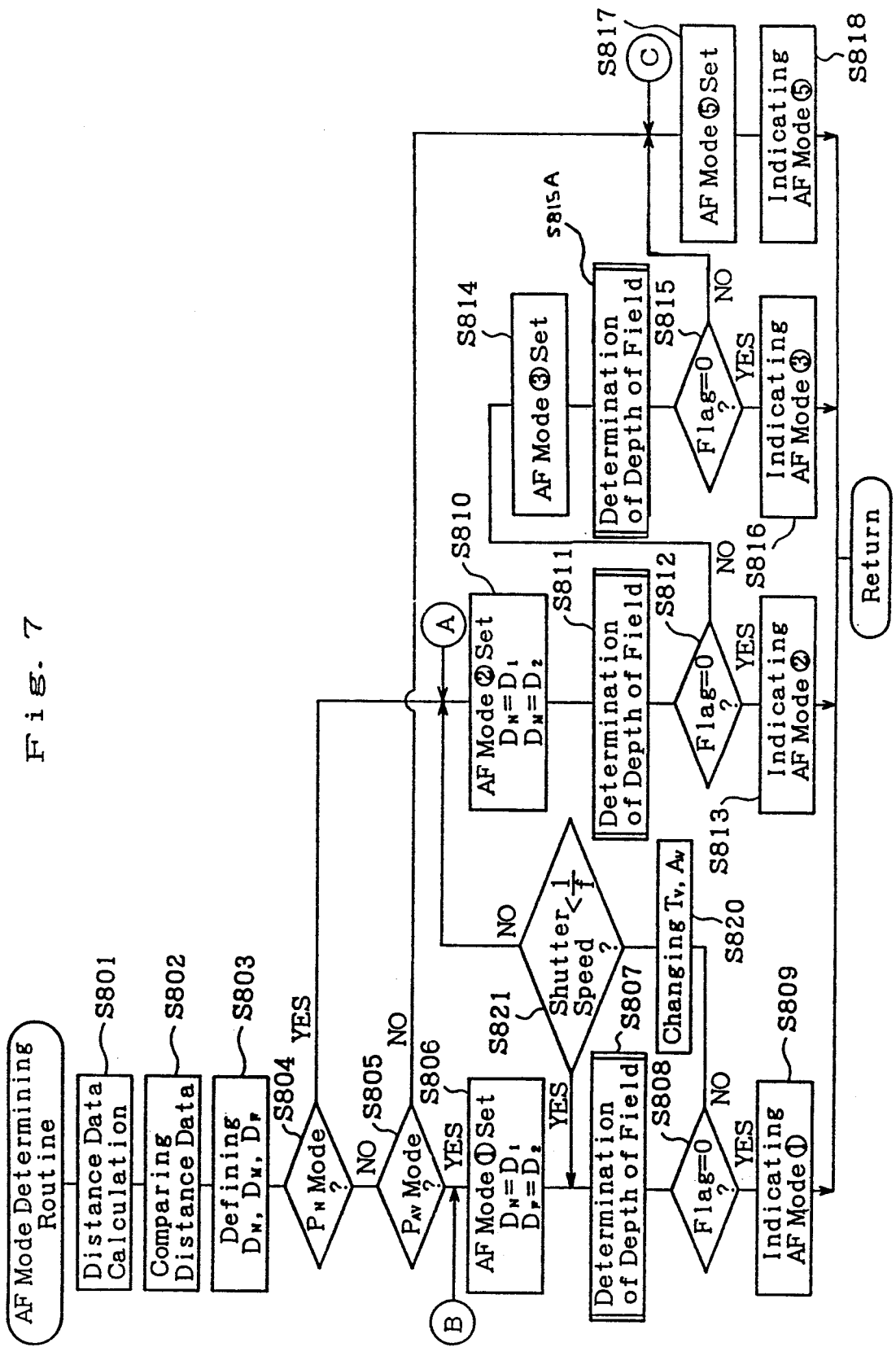
FIG. 7 is a flow chart showing the AF mode determining routine.

FIG. 7 is a flow chart showing the AF mode determining routine in step S8 of the main routine.

In step S801, distance data corresponding to the three distance measuring zones A, B and C (FIG. 1a) are calculated in accordance with the defocus amount x' and the equation (3). Then, in step S802, the calculated distance data are compared, and in step S803, the distance data are defined as $D_N$, $D_M$, $D_F$ in the order of which is closest to the camera, and stored in the RAM of the CPU 37. The AF mode is decided in accordance with the selected photographing mode, as follows.

In step S804, it is determined whether or not the photographing mode is the $P_N$ mode, and in step S805, it is determined whether or not the photographing mode is the $P_{AV}$ mode. If the $P_{AV}$ mode has been set, the process goes to step S806, in which the AF mode ① is set and $D_N = D_1$ and $D_F = D_2$ are defined.

Then, in step S807, based on the equations (1) and (2), a depth of field is determined.

If $D_1$ and $D_2$ are within the depth of field under the AF mode ①, a determination flag is set to "0"; conversely, if they are out of the depth of field, the flag is set to "1".

Therefore, if it is determined that the determination flag is "0" in step S808, the process goes to step S809, in which the AF mode ① is indicated in the view finder, or at the external indication part 41.

If it is determined that the determination flag is "1" in step S808, the process goes to step S820, in which the value $T_V$ and the value $A_V$ are changed while keeping the value $E_V$ constant so that the shutter speed is made slower, to stop down the aperture and increase the depth of field. In step S821, it is determined whether or not the shutter speed corresponding to the value $T_V$ obtained by step S820 is less than 1/f, which is a reciprocal number of the focal length, i.e., it is determined whether or not the shutter speed is faster than a camera shake limit. If the shutter speed is faster than 1/f, i.e., if it is determined that little camera shake will occur, the process goes to step S807 in which a depth of field is determined in accordance with the aperture value changed in step S820. In step S821, if the shutter speed is slower than or equal to 1/f, i.e., if it is determined that camera shake will easily occur, the process goes to step S810.

Namely, if the determining flag is "1" in step S808, and it is determined that the shutter speed is slower than or equal to 1/f in step S821, the AF mode ② is set, and $D_N = D_1$ and $D_M = D_2$ are defined in step S810. In step S811, the determination of the depth of field, as in step S807, is carried out, and in step S812, it is determined whether or not a determination flag is "0".

If it is determined in step S812 that the determination flag is "0", the process goes to step S813, in which the AF mode ② is indicated in the view finder. Conversely, if it is determined in step S812 that the determination flag is "1", the process goes to step S814, in which the next AF mode ③ is selected. In this AF mode ③, two points in which the distance between two objects is the smallest among all the points are selected, and the determination of the depth of field is carried out.

Figure 8:
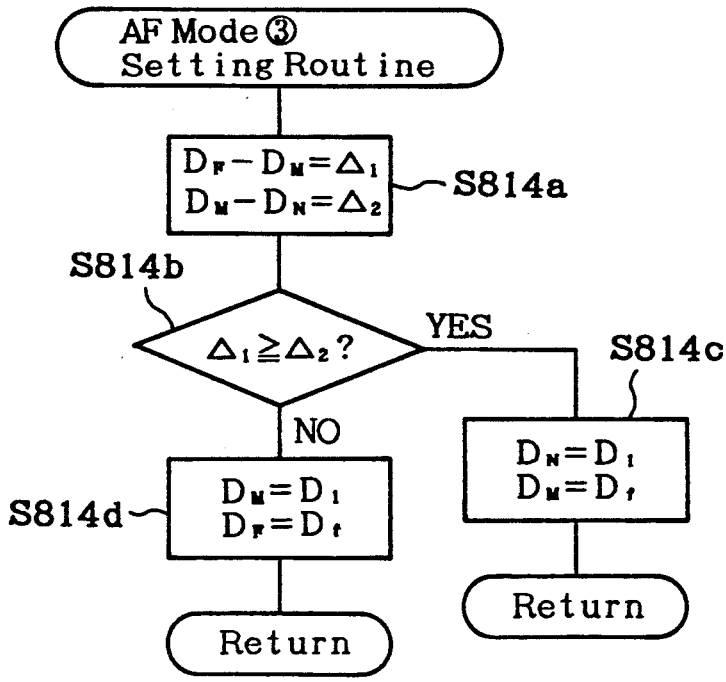
FIG. 8 is a flow chart showing the AF mode ③ setting routine.

FIG. 8 is a flow chart showing the AF mode ③ setting routine carried out in step S814 of the AF mode determining routine.

In step S814a, $D_F - D_M = \Delta_1$ and $D_M - D_N = \Delta_2$ are calculated, and in step S814b, it is determined whether or not $\Delta_1 \geq \Delta_2$. If it is determined that $\Delta_1 \geq \Delta_2$, the process goes to step S814c, $D_N = D_1$ and $D_M = D_f$ are defined, and the process returns to step S815A (of FIG. 7) wherein, based upon these values, it is determined whether the object is within the depth of field. In step S814b, if it is not determined that $\Delta_1 \geq \Delta_2$, the process goes to step S814d, $D_M = D_1$ and $D_F = D_f$ are defined, and the process returns to step S815A (FIG. 7) wherein, based on these values, it is determined whether the object is within the depth of field."

In step S815, it is determined whether or not a determining flag is "0". If the determining flag is "0", step S816 is carried out so that the AF mode ③ is indicated in the view finder. Conversely, if the determining flag is "1", the process goes to step S817, in which the AF mode ⑤ is set, and the AF mode ⑤ is indicated in the view finder in step S818.

As described above, the AF modes in the $P_{AV}$ mode are controlled in such a manner that, if the determination flag is "1", the AF modes are changed as ①→②→③→⑤.

Figure 9:
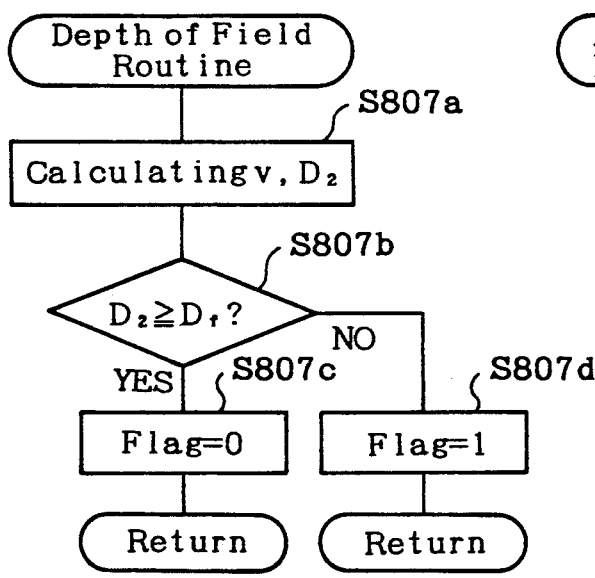
FIG. 9 is a flow chart showing a routine for determining a depth of field.

FIG. 9 is a flow chart showing a routine for determining a depth of field, as carried out in steps S807, S811, and S815A as shown in FIG. 7.

When carrying out the determination of the depth of field, in step S807a, the distances v and $D_z$ are obtained by the equations (1) and (2), and then, in step S807b, it is determined whether or not $D_z \geq D_f$. If it is determined that $D_z \geq D_f$, the process goes to step S807c, in which a determination flag is set to "0", and if it is not determined that $D_z \geq D_f$, the process goes to step S807d, in which a determination flag is set to "1".

On the other hand, if it is determined that the $P_N$ mode has been selected in step S804, the process goes to step S810 so that the AF mode ② is first set, and then the determination of depth of field is carried out in step S811, and if the flag is "1" in step S812 or S814, the AF mode is changed as ② → ③ → ⑤, as for the $P_{AV}$ mode.

If it is determined that the $P_{TV}$ mode has been selected in step S805 shown in FIG. 7, the process goes to step S817, so that the AF mode ⑤ is set.

According to the embodiment described above, the AF mode is automatically selected in accordance with the photographing modes $P_{AV}$, $P_N$ and $P_{TV}$, and the taking lens 21 is moved to the most suitable position at which it is in-focus, so that a photograph as desired by the photographer can be obtained, and because the selection and changing of the AF mode does not require manual operation, it is easy for even a beginner to handle the camera.

Figure 10:
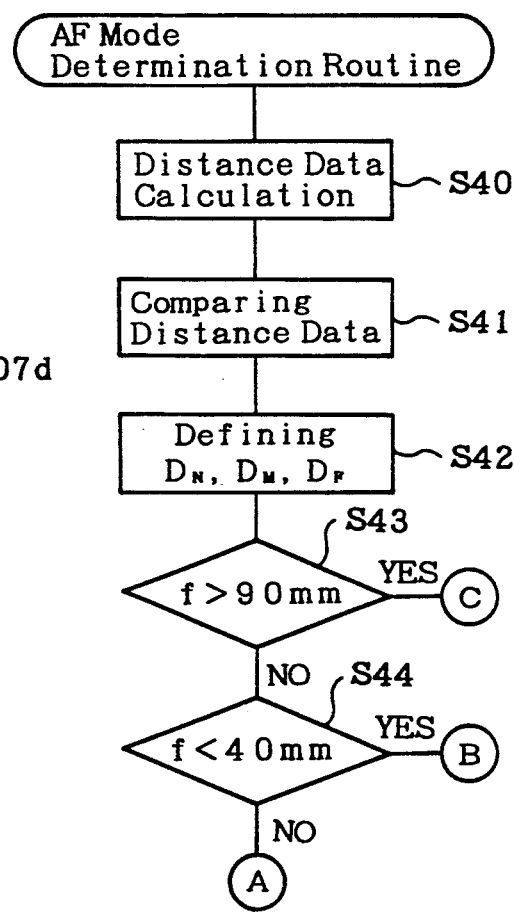
FIG. 10 is a flow chart showing an AF mode determination routine.

Note that, in the present invention, the AF mode can be selected based on a focal length of the taking lens 21 mounted on the camera body 26, and in this case, an AF mode determination routine according to the flow chart shown in FIG. 10 is carried out.

In step S40, distance data x is obtained by using distance measuring data and the equation (3). In step S41, the calculated distance data are compared, and in step S42, the distance data are defined as $D_N$, $D_M$, $D_F$, in the order in which they are closest to the camera.

In step S43, it is determined whether or not a lens focal length f>90 mm, and if f>90 mm, the process goes to step S817 of FIG. 7. If f≦90 mm, the process goes to step S44, in which it is determined whether or not f<40 mm. If f<40 mm, the process goes to step S806 of FIG. 7, and if f≧40 mm, the process goes to step S810 of FIG. 7. Thus, the AF mode is automatically determined in accordance with the data in table of the priorities in the AF mode.

Although the embodiments of the present invention have been described herein with reference to the accompanying drawings, obviously many modifications and changes may be made by those skilled in this art without departing from the scope of the invention.

I claim:

1. An automatic focusing camera for carrying out photographing according to a photographing mode, and having a view finder provided with a plurality of distance measuring zones, said camera comprising:

a photographing lens;

means for measuring distances of objects corresponding to said distance measuring zones, respectively, and to output distance measuring data denoting the object distances;

means for selecting, in accordance with the photographing mode and the distance measuring data, one of a plurality of automatic focusing modes in which an automatic focusing operation is carried out based on one or a plurality of the distance measuring data which correspond to said distance measuring zones, respectively, and are obtained by said measuring means;

means for calculating, based on lens information of said photographing lens and the distance measuring data, a depth of field in accordance with the selected automatic focusing mode;

means for determining whether or not a respective object distance measured by said measuring means is within the calculated depth of field; and means for controlling a focusing of said photographing lens in accordance with a result determined by said determining means, to thereby cause said photographing lens to be moved into the depth of field.

2. An automatic focusing camera according to claim 1, further comprising means for measuring the luminance of the object to thereby output luminance data denoting the photometry, said controlling means calculating a shutter speed and an aperture value based on the photographing mode and the photometry data.

3. An automatic focusing device according to claim 1, wherein said automatic focusing modes include a mode in which said photographing lens is moved to a position at which all of the measured object distances are within the depth of field.

4. An automatic focusing device according to claim 1, wherein said automatic focusing modes include a mode in which two distance measuring zones in which the objects are closest to the photographer are selected, and the photographing lens is moved to a position at which the two object distances are within the depth of field.

5. An automatic focusing device according to claim 1, wherein said automatic focusing modes include a mode in which two distance measuring zones in which the distance between two objects is the smallest among all of the distance measuring zones are selected, and the photographing lens is moved to a position at which the object distances of the two objects are within the depth of field.

6. An automatic focusing device according to claim 1, wherein said automatic focusing modes include a mode in which the distance measuring zone in which the object distance is an intermediate distance among all the distance measuring zones is selected, and the photographing lens is moved to a position at which the object distance is within the depth of field.

7. An automatic focusing device according to claim 1, wherein said automatic focusing modes include a mode in which the object distance closest to the photographer, among all the distance measuring zones, is selected, and the photographing lens is moved to a position at which the object distance is within the depth of field.

8. An automatic focusing device according to claim 1, wherein said automatic focusing modes include a mode in which the object distance farthest from the photographer among the distance measuring zones is selected, and the photographing lens is moved to a position at which the object distance is within the required depth of field.

9. An automatic focusing device according to claim 1, wherein said automatic focusing modes are given priorities, respectively, so that, when an automatic focusing mode having a highest priority can not be selected, another automatic focusing mode having a next order of priority is selected.

10. An automatic focusing device according to claim 9, wherein a plurality of said photographing modes are provided and the priorities of each of said automatic focusing modes are different in each photographing mode.

11. An automatic focusing camera having a view finder provided with a plurality of distance measuring zones, said camera comprising:
   a photographing lens;
   means for measuring distances of objects corresponding to said distance measuring zones, respectively, and to output distance measuring data denoting the object distances;
   means for selecting, in accordance with a focal length of said photographing lens and the distance measuring data, one of a plurality of automatic focusing modes in which an automatic focusing operation is carried out based on one or a plurality of the distance measuring data which correspond to said distance measuring zones, respectively, and are obtained by said measuring means;
   means for calculating, based on lens information of said photographing lens and the distance measuring data, a depth of field in accordance with the selected automatic focusing mode;
   means for determining whether or not a respective object distance measured by said measuring means is within the calculated depth of field; and
   means for controlling a focusing of said photographing lens in accordance with a result determined by said determining means, to thereby cause said photographing lens to be moved into the depth of field.

12. An automatic focusing camera comprising:
   a photographing lens;
   means for measuring distances of objects corresponding to a plurality of distance measuring zones;
   means for selecting in accordance with a photographing mode and distance measuring data, one of a plurality of automatic focusing modes in which an automatic focusing operation is carried out based on one or a plurality of the distance measuring data which correspond to said distance measuring zones, respectively, and are obtained by said measuring means;
   means for calculating, based on lens information and the distance measuring data, a depth of field in accordance with the selected automatic focusing mode;
   means for determining whether or not a respective object distance corresponding to the distance measuring data is within the calculated depth of field; and
   means for controlling a focusing of said photographing lens in accordance with a result determined by said determining means, to thereby cause said photographing lens to be moved into focus.

13. An automatic focusing camera for carrying out photographing according to a photographing mode, and having a view finder provided with a plurality of distance measuring zones, said camera comprising:
   a photographing lens;
   means for measuring distances of objects corresponding to said distance measuring zones, respectively, and to output distance measuring data denoting the measured object distances;
   means for setting one of a plurality of automatic focusing modes in which an automatic focusing operation is carried out based on one or a plurality of the distance measuring data which correspond to said distance measuring zones, respectively, and are obtained by said measuring means;
   means for calculating, based on lens information of said photographing lens and the distance measuring data, a depth of field in accordance with the set automatic focusing mode;
   means for determining whether or not a respective object distance measured by said measuring means is within the calculated depth of field; and
   means for controlling focusing of said photographing lens in accordance with a result determined by said determining means, to thereby cause said photographing lens to be moved into a depth of field.

* * * * *